United States Patent [19]

Yonan

[11] 3,905,982

[45] Sept. 16, 1975

[54] 1-ARYL-N-DIALKYLAMINOALKYL-3,4-DIHYDRO-2(1H)-ISOQUINOLINECARBOXAMIDES AND RELATED COMPOUNDS

[75] Inventor: Peter K. Yonan, Morton Grove, Ill.

[73] Assignee: G. D. Searle & Co., Chicago, Ill.

[22] Filed: July 23, 1973

[21] Appl. No.: 381,505

[52] U.S Cl. .............. 260/287 R; 260/247.5 GP; 260/268 BQ; 260/283 SY; 260/283 R; 260/289 R; 260/559 D; 260/286 R; 260/286 Q; 260/340.3; 260/340.6; 260/570.5 R; 260/611 R; 424/25 P; 424/250; 424/248

[51] Int. Cl.² .................. C07D 217/06
[58] Field of Search .................. 260/287

[56] References Cited
UNITED STATES PATENTS

| | | | |
|---|---|---|---|
| 3,483,206 | 12/1969 | Werner | 260/287 |
| 3,524,858 | 8/1970 | Kaminsky et al. | 260/287 |
| 3,634,429 | 1/1972 | Leimgruber et al. | 260/287 |
| 3,666,763 | 5/1972 | Grethe | 260/289 R |

OTHER PUBLICATIONS

Perron et al., J. Med. Chem., Jan. 1966, Vol. 9, p. 141.

Primary Examiner—Donald G. Daus
Assistant Examiner—David E. Wheeler
Attorney, Agent, or Firm—John J. Kotano

[57] ABSTRACT

1-Aryl-N-dialkylaminoalkyl-3,4-dihydro-2(1H)-isoquinolinecarboxamides and related N-substituted amides having anti-arrhythmic, anti-bacterial, anti-fungal, anti-algal and anthelmintic activity are described herein. The subject compounds can be prepared by reacting the appropriate 3,4-dihydro-2(1H)-isoquinolinecarbonyl chloride with a dialkylaminoalkylamine or similar compound, or by reacting an N-(chloroalkyl)-3,4-dihydro-2(1H)-isoquinolinecarboxamide with the appropriate dialkylamine or similar compound.

12 Claims, No Drawings

1-ARYL-N-DIALKYLAMINOALKYL-3,4-DIHYDRO-2(1H)-ISOQUINOLINECARBOXAMIDES AND RELATED COMPOUNDS

The present invention relates to a group of 3,4-dihydro-2(1H)-isoquinolinecarboxamides. More particularly, the present invention relates to a group of compounds having the general formula

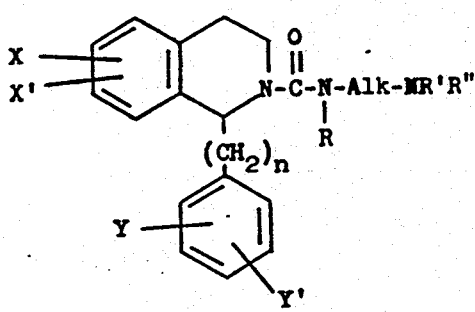

wherein X and X' are each selected from the group consisting of hydrogen, lower alkoxy, hydroxy, benzyloxy and lower alkyl, or X and X' together represent a single methylenedioxy or ethylenedioxy group; Y and Y' are each selected from the group consisting of hydrogen, halogen and lower alkoxy; n is selected from the group consisting of 0 and 1; R is selected from the group consisting of hydrogen and lower alkyl; Alk is lower alkylene separating the nitrogen atoms attached thereto by at least 2 carbon atoms; and NR'R" is selected from the group consisting of di(lower alkyl)amino, N-cycloalkyl(lower alkylamino), 1-pyrrolidinyl, hexamethyleneimino, morpholino, piperidino, 4-phenylpiperidino, 4-benzylpiperidino, 4-methyl-1-piperazinyl and 4-phenyl-1-piperazinyl.

The lower alkoxy groups referred to above contain 1 to 6 carbon atoms and are exemplified by groups such as methoxy, ethoxy, propoxy and isopropoxy. The lower alkyl groups likewise contain 1 to 6 carbon atoms and can be exemplified by methyl, ethyl, propyl, isopropyl and the like. Examples of di(lower alkyl) amino groups would then be dimethylamino, diethylamino, dipropylamino, diisopropyl=amino and the like. The lower alkylene groups referred to above contain 2 to 6 carbon atoms and can be exemplified by groups such as ethylene, propylene, trimethylene and 1,4-pentylene. The halogen atoms include fluorine, chlorine, bromine and iodine. The cycloalkyl groups contain 5 to 7 carbon atoms and include cyclopentyl, cyclohexyl and cycloheptyl.

Equivalent to the compounds of formula (I) for the purposes of this invention are the pharmaceutically acceptable acid addition and quaternary ammonium salts thereof. Such acid addition salts can be derived from a variety of organic and inorganic acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. Similarly, the quaternary ammonium salts can be derived from a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, di-methyl sulfate, methyl benzenesulfonate, ethyl toluene-sulfonate, ethylene chlorohydrin, propylene chlorohydrin, allyl bromide, methallyl bromide and crotyl bromide.

The compounds of this invention are useful because of their pharmacological properties. In particular, they possess activity as anti-arrhythmic agents. Thus, they bring about a return to normal heat rhythm in animals in which the heart rhythm has become irregular.

The anti-arrhythmic utility of the instant compounds is evident from the results of a standardized test for their capacity to slow the ventricular tachycardia induced by aconitine in the isolated rabbit heart. The procedure is essentially that described by Lucchesi [J. Pharmacol. Exp. Therap., 137, 291 (1962)], modified in certain particulars as follows: Hearts are obtained from adult albino rabbits of either sex and perfused in apparatus modeled after that devised by Anderson and Craver [J. Pharmacol. Exp. Therap., 93, 135 (1948)]. The composition of the perfusion solution is the same as Lucchesi's, but the volume is increased to 200 ml. and the temperature lowered to 28°C. Aconitine (ordinarily as the nitrate) is administered as soon as the heart beat is regular and the EKG pattern normal, the dose being so selected as to at least double the rate. Typically, 0.05 ml. of 0.1% aconitine nitrate in physiological saline is injected. EKG's are recorded at 5 minute intervals after onset of ventricular tachycardia until two successive readings show stabilization of the rate. Perfusate collected during this time is discarded and replaced with fresh solution q.s. 200 ml. Promptly following stabilization, 2 mg. of compound dissolved or suspended in 1 ml. of physiological saline is mixed with the perfusion solution. Ten minutes later a like amount is introduced, followed after a further ten minutes by double the first amount. Final concentration of compound in the perfusion solution is thus 40 mg. per liter. Recording of EKG's is continued at 5 minute intervals throughout this time and for 10 minutes thereafter. A compound is considered anti-arrhythmic if, at any time during the 30 minutes immediately following initial administration in at least half of a minimum of two tests, it reduces by 50% or more the rate recorded ten minutes after onset of tachycardia. Among the compounds of this invention which have been found particularly active in this test are the representative compounds N-(2-diisopropylaminoethyl)-6,7-dimethoxy-1-phenyl-3,4-dihydro-2(1H)-isoquinolinecarboxamide; 6,7-dimethoxy-1-phenyl-N-(2-piperidinoethyl)-3,4-dihydro-2(1H)-isoquinolinecarboxamide; N-(2-diisopropylaminoethyl)-1-phenyl-3,4-dihydro-2(1H)-isoquinolinecarboxamide; N-{2-[N-cyclohexyl(methylamino)]ethyl}-6,7-dimethoxy-1-phenyl-3,4-dihydro-2(1H)-isoquinolinecarboxamide; and 7-benzyloxy-N-{2-[N-cyclohexy(methylamino)]ethyl}-6-methoxy-1-phenyl-3,4-dihydro-2(1H)-isoquinolinecarboxamide.

The compounds of the present invention also possess anti-biotic activity against a variety of micro=organisms. Thus, they inhibit the growth of bacteria such as *Bacillus subtilis* and *Erwinia sp.*, fungi such as *Verticillium albo-atrum* and algae such as *Chlorella vulgaris*. In addition, they possess anthelmintic activity. By virtue of their anti-biotic activity, these compounds can be combined with various known excipients and adjuvants in the form of dusts, solutions, suspensions, ointments and sprays to provide compositions useful for disinfecting purposes.

The compounds of the present invention can be conveniently prepared by contacting a compound of the formula

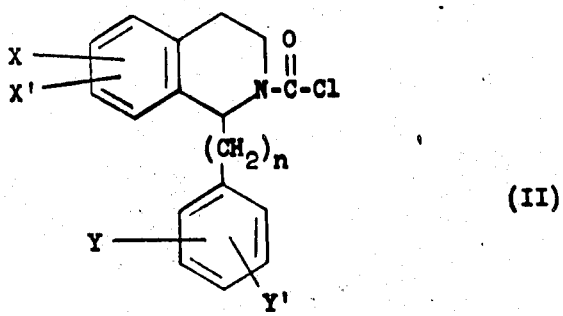

with the appropriate diamine of the formula

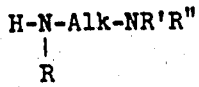

wherein X, X', Y, Y', n, R, Alk and NR'R" are defined as before. Depending on the nature of the reactants, it is possible to carry out this reaction in the presence or absence of a solvent. The use of a solvent is, however, generally preferred. An especially desirable solvent is chloroform, while other possible solvents would include aromatic hydrocarbons such as benzene and toluene, halogenated hydrocarbons such as methylene chloride and carbon tetrachloride, ketones such as acetone and 2-butanone and ethers such as ethyl ether, tetrahydrofuran and dioxane. Time and temperature are not critical factors for the conduct of this reaction, typical temperatures varying from room temperature to reflux and typical times being in the range of 30 minutes to several days.

An alternate route to the subject compounds involves contacting a compound of the formula

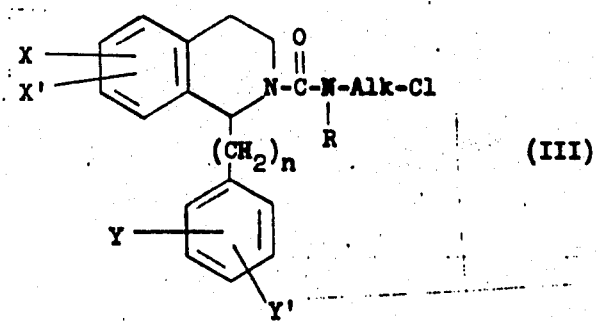

with an appropriate secondary amine of the formula

H—NR'R"

wherein X, X', Y, Y', n, Alk and NR'R" are defined as before. This reaction is conducted in a suitable solvent, preferably a ketone (e.g., 2-butanone or acetone). Other possible solvents include aromatic hydrocarbons (e.g., benzene and toluene), high boiling ethers (e.g., dioxane), lower alkanols (e.g., methanol and ethanol), dimethylformamide and dimethylsulfoxide. Time and temperature are not critical. Reaction temperature can vary from room temperature to approximately 100°C., with a temperature range of room temperature to 60°-70°C. being typical. Time varies from a few hours to several days, depending on the particular temperature employed.

An alternative process for the preparation of the subject compounds wherein R is a lower alkyl group proceeds by contacting a compound of formula (I) wherein R is hydrogen with a lower alkyl halide in the presence of sodium hydride or sodamide. The reaction is conducted in a solvent which is unreactive toward the sodium hydride or sodamide employed, the solvent of choice being dimethyl-sulfoxide. Other possible solvents include ethers such as tetrahydrofuran and dioxane. When sodamide is used, it is also possible to employ an aromatic solvent, e.g., benzene or toluene. Time and temperature are not critical. The reaction can be conducted at a temperature ranging from room temperature to 100°C., with a temperature range of room temperature 60°-70°C. being preferred. Reaction time usually varies from 3 to 24 hours.

The compounds of formula (I) wherein X and/or X' are/is hydroxy can be prepared from the corresponding compounds of formula (I) wherein X and/or X' are/is benzyloxy. Debenzylation is conveniently effected by catalytic hydrogenolysis. Suitable catalysts include platinum, Raney nickel, copper-chromium oxide and palladium (optionally on a support), a particularly preferred catalyst being palladium-on-carbon. The hydrogenation is conveniently conducted in a solvent, the choice of solvent depending upon the particular starting material employed. Generally speaking, a wide variety of solvents, such as lower alkanols (e.g., methanol, ethanol and 2-propanol), ethers (e.g., tetrahydrofuran), water and acetic acid, could be used. The reaction is generally conducted at a temperature ranging from room temperature to 100°C., with a temperature range of room temperature to 50°-60°C. being typical.

The novel starting materials of formula (II) above can be readily prepared by contacting a compound of the formula

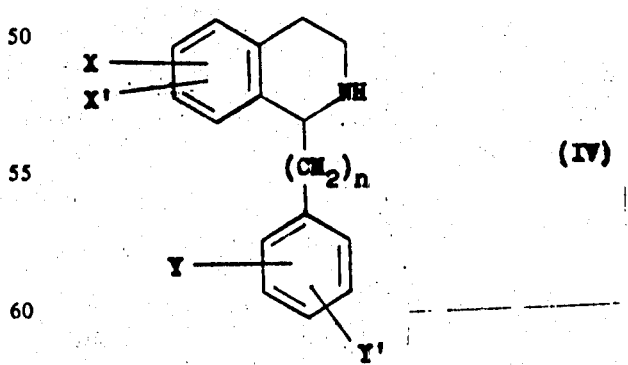

wherein X, X', Y, Y' and n are as hereinbefore defined with phosgene.

Certain of the starting materials of formula (III) above can be prepared from the corresponding compounds of formula (IV) by treatment with a chloroalkylisocyanate of the formula $$O=C=N-Alk-Cl$$

wherein Alk is defined as before.

The invention will appear more fully from the examples which follow. These examples are given by way of illustration only and are not to be construed as limiting the invention either in spirit or in scope as many modifications both in materials and methods will be apparent to those skilled in the art. In these examples, temperatures are given in degrees centigrade and quantities of materials are expressed in parts by weight unless otherwise specified. The relationship between parts by weight and parts by volume is the same as that existing between grams and milliliters.

EXAMPLE 1

A mixture of 50 parts of 3-benzyloxy-4-methoxybenzaldehyde, 25 parts of nitromethane, 2.1 parts of glacial acetic acid and 2.2 parts of n-butylamine in 39.5 parts of ethanol is heated until dissolved. The resulting solution is allowed to stand overnight. The crystals which form are separated by filtration and washed with ethanol. There is thus obtained 3-benzyloxy-4-methoxy-β-nitrostyrene, melting at about 126°–128°C.

Substitution of a like quantity of 4-benzyloxy-3-methoxybenzaldehyde for the 3-benzyloxy-4-methoxybenzaldehyde used above and substantial repetition of the foregoing procedure gives 4-benzyloxy-3-methoxy-β-nitrostyrene, melting at about 118°–121°C.

Substitution of an equivalent quantity of 3,4-methylenedioxybenzaldehyde or 3,4-ethylenedioxybenzaldehyde for the 3-benzyloxy-4-methoxybenzaldehyde used above and substantial repetition of the procedure detailed in the first paragraph of this example affords 3,4-methylenedioxy-β-nitrostyrene or -ethylenedioxy-β-ethylenedioxy-β-nitrostyrene, respectively.

EXAMPLE 2

To a suspension of 20 parts of lithium aluminum hydride in 444 parts of tetrahydrofuran and 177 parts of ethyl ether is added portionwise, over a 1 hour period, a warm solution of 56 parts of 3-benzyloxy-4-methoxy-β-nitrostyrene in 267 parts of tetrahydrofuran. The reaction mixture is refluxed for an additional 2 hours, then is cooled in ice and decomposed by adding 40 parts of water in 71 parts of tetrahydrofuran, followed by 40 parts by volume of a 25% by weight aqueous sodium hydroxide solution, followed by 40 parts of water. The salts are removed by filtration and the filtrate is dried over anhydrous calcium sulfate and stripped of solvent under reduced pressure to afford, as an oil, 3-benzyloxy-4-methoxyphenethylamine.

Substitution of a like quantity of 4-benzyloxy-3-methoxy-β-nitrostyrene for 3-benzyloxy-4-methoxy-β-nitrostyrene used above and substantial repetition of the foregoing procedure affords, as an oil, 4-benzyloxy-3-methoxyphenethylamine.

Substitution of an equivalent quantity of 3,4-methylenedioxy-β-nitrostyrene or 3,4-ethylenedioxy-β-nitrostyrene for the substituted β-nitrostyrene called for in the first paragraph of this example and substantial repetition of the procedure there detailed affords 3,4-methylenedioxyphenethylamine or 3,4-ethylenedioxyphenethyl=amine, respectively.

EXAMPLE 3

A solution of 45 parts of benzoyl chloride in 149 parts of chloroform is added portionwise over a 30 minute period to a solution of 78 parts of 3-benzyloxy-4-methoxyphenethylamine in 72 parts of triethylamine and 596 parts of chloroform. The mixture is stirred at room temperature for an additional 90 minutes. It is then washed twice with water and once with dilute aqueous sodium bicarbonate solution, dried over anhydrous calcium sulfate and stripped to a low volume under reduced pressure. Addition of n-hexane results in crystallization of N-(3-benzyloxy- 4-methoxyphenethyl)benzamide. That product melts at about 136°–138°C.

The above procedure is repeated using a like quantity of 4-benzyloxy-3-methoxyphenethylamine in place of the 3-benzyloxy-4-methoxyphenethylamine. There is thus obtained N-(4-benzyloxy-3-methoxyphenethyl)benzamide, melting at about 128°–130°C.

Substitution of an equivalent quantity of 3,4-methylenedioxyphenethylamine or 3,4-ethylenedioxyphenethylamine for the substituted phenethylamine called for in the first paragraph of this example and substantial repetition of the procedure there detailed affords N-(3,4-methylenedioxyphenethyl)benzamide or N-(3,4-ethylenedioxyphenethyl)benzamide, respectively.

EXAMPLE 4

A solution of 64 parts of N-(3-benzyloxy-4-methoxyphenethyl)benzamide and 192 parts of phosphorus oxychloride in 348 parts of toluene is refluxed for 3 and ½ hours. The solution is stripped in vacuo until a precipitate forms. Ethyl ether is added and the mixture is filtered. The solid residue, which is 6-benzyloxy-7-methoxy-1-phenyl-3,4-dihydroisoquinoline hydrochloride, is dissolved in water. Dilute aqueous sodium hydroxide solution is added and the mixture is extracted with methylene chloride. The methylene chloride extract is dried over anhydrous calcium sulfate and concentrated to a low volume and n-hexane is then added. The crystals which form are separated by filtration. There is thus obtained 6-benzyloxy- 7-methoxy-1-phenyl-3,4-dihydroisoquinoline, melting at about 144°–145°C.

The above procedure is repeated using a like quantity of N-(4-benzyloxy-3-methoxyphenethyl)benzamide in place of the N-(3-benzyloxy-4-methoxyphenethyl)benzamide. In this manner, there is obtained 7-benzyloxy-6-methoxy-1-phenyl-3,4-dihydroisoquinoline, melting at about 134°–137°C.

Substitution of an equivalent quantity of N-(3,4-methylenedioxyphenethyl)benzamide or N-(3,4-ethylenedioxyphenthyl)benzamide for the substituted benzamide called for in the first paragraph of this example and substantial repetition of the procedure there detailed affords 6,7-methylenedioxy-1-phenyl-3,4-dihydroisoquinoline or 6,7-ethylenedioxy-1-phenyl-3,4-dihydroisoquinoline, respectively.

EXAMPLE 5

A suspension of 38 parts of 6-benzyloxy-7-methoxy-1-phenyl-3,4-dihydroisoquinoline in 435 parts of ethanol is heated to approximately 55°C. 32 Parts of sodium borohydride is added portionwise over a 45 minute period, while maintaining the reaction temperature at 50°–60°C. The mixture is stirred for an additional 3 hours at approximately 50°C. and a precipitate forms. The reaction mixture is then poured into water and the precipitate is separated by filtration, affording 6-benzyloxy-7-methoxy-1-phenyl-1,2,3,4-tetrahydroisoquinoline, melting at about 118°–119°C.

Substitution of a like quantity of 7-benzyloxy-6-methoxy-1-phenyl-3,4-dihydroisoquinoline for the 6-benzyloxy-7-methoxy-1-phenyl-3,4-dihydroisoquinoline used above and substantial repetition of the foregoing procedure gives 7-benzyloxy-6-methoxy-1-phenyl-1,2,3,4-tetrahydroisoquinoine, melting at about 123°–125°C.

Substitution of an equivalent quantity of 6,7-methylenedioxy-1-phenyl-3,4-dihydroisoquinoline or 6,7-ethylenedioxy-1-phenyl-3,4-dihydroisoquinoline for the substituted 3,4-dihydroisoquinoline called for in the first paragraph of this example and substantial repetition of the procedure there detailed affords 6,7-methylenedioxy-1-phenyl-1,2,3,4-tetrahydroisoquinoline or 6,7-ethylenedioxy-1-phenyl-1,2,3,4-tetrahydroisoquinoline, respectively.

EXAMPLE 6

50 Parts of p-fluorobenzaldehyde and 65 parts of 3,4-dimethoxyphenethylamine are combined and heated over a a steam bath in a nitrogen atomsphere for 90 minutes. Then 800 parts by volume of 20% by weight hydrochloric acid is added and heating is continued for an additional 3 hours. The reaction mixture is cooled, made alkaline with sodium hydroxide and extracted with methylene chloride. The organic layer is dried over anhydrous calcium sulfate and stripped in vacuo to give 6,7-dimethoxy-1-(4-fluorophenyl(-1,2,3,4-tetrahydroisoquinoline. After crystallization from a mixture of ethyl ether and n-hexane, that product melts at about 145°–150°C.

Substitution of an equivalent quantity of p-chlorobenzaldehyde for the p-fluorobenzaldehyde used above and substantial repetition of the foregoing procedure affords 1-(4-chlorophenyl)-6,7-dimethoxy-1,2,3,4-tetrahydroisoquinoline, melting at about 110°–111°C.

EXAMPLE 7

To a mixture of 27 parts of 6,7-dimethoxy-1-phenyl-1,2,3,4-tetrahydroisoquinoline and 11 parts of triethylamine in 220 parts of benzene is added portionwise, at room temperature over a 40 minute period, 160 parts of a benzene solution containing 20 parts of phosgene. After the addition is complete, the reaction mixture is stirred at room temperature for an additional 90 minutes, then is heated up to reflux for 30 minutes and filtered. The filtrate is evaporated to afford a residual solid, ethyl ether is added and the mixture is filtered. The solid thus obtain is 6,7-dimethoxy-1-phenyl-3,4-dihydro-2(1H)-isoquinolinecarbonyl chloride, melting at about 151°–152°C.

Substitution of an equivalent quantity of the 1,2,3,4-tetrahydroisoquinolines indicated below for the 6,7-dimethoxy-1-phenyl-1,2,3,4-tetrahydroisoquinoline used above and substantial repetition of the foregoing procedure affords the following products:

Use of 6,7-dimethoxy-1-(4-methoxyphenyl)-1,2,3,4-tetrahydroisoquinoline affords 6,7-dimethoxy-1-(4-methoxyphenyl)-3,4-dihydro-2-(1H)-isoquinolinecarbonyl chloride, melting at about 113°–120°C.

Use of 6,7-dimethoxy-1-(3,4-dimethoxyphenyl)-1,2,3,4-tetrahydroisoquinoline affords 6,7-dimethoxy-1-(3,4-dimethoxyphenyl)-3,4-dihydro-2-(1H)-isoquinolinecarbonyl chloride, as an oil.

Use of 1-phenyl-1,2,3,4-tetrahydroisoquinoline affords 1-phenyl-3,4-dihydro-2-(1H)-isoquinolinecarbonyl chloride, as an oil.

Use of 6-benzyloxy-7-methoxy-1-phenyl-1,2,3,4-tetrahydroisoquinoline affords 6-benzyloxy-7-methoxy-1-phenyl-3,4-dihydro-2(1H)-isoquinolinecarbonyl chloride, as a waxy solid.

Use of 7-benzyloxy-6-methoxy-1-phenyl-1,2,3,4-tetrahydroisoquinoline affords 7-benzyloxy-6-methoxy-1-phenyl-3,4-dihydro-2(1H)-isoquinolinecarbonyl chloride, as a waxy solid.

Use of 1-benzyl-6,7-dimethoxy-1,2,3,4-tetrahydroisoquinoline affords 1-benzyl-6,7-dimethoxy-3,4-dihydro-2(1H)-isoquinolinecarbonyl choride, melting at about 124°–125°C.

Use of 1-(4-chlorophenyl)-6,7-dimethoxy-1,2,3,4-tetrahydroisoquinoline affords 1-(4-chlorophenyl)-6,7-dimethoxy-3,4-dihydro-2(1H)-isoquinolinecarbonyl chloride.

Use of 6,7-dimethoxy-1-(4-fluorophenyl)-1,2,3,4,-tetrahydroisoquinoline affords 6,7-dimethoxy-1-(4-fluorophenyl)-3,4-dihydro-2(1H)-isoquinolinecarbonyl chloride, melting at about 133°–135°C.

Use of 7-methyl-1-phenyl-1,2,3,4-tetrahydroisoquinoline affords 7-methyl-1-phenyl-3,4-dihydro-2(1H)-isoquinolinecarbonyl chloride.

Use of 6,7-methylenedioxy-1-phenyl-1,2,3,4-tetrahydroisoquinoline affords 6,7-methylenedioxy-1-phenyl-3,4-dihydro-2(1H)-isoquinolinecarbonyl chloride.

Use of 6,7-ethylenedioxy-1-phenyl-1,2,3,4-tetrahydroisoquinoline affords 6,7-ethylenedioxy-1-phenyl-3,4-dihydro-2(1H)-isoquinolinecarbonyl chloride.

EXAMPLE 8

To 10 parts by volume of 2-diethylaminoethylamine is added 3.0 parts of 6,7-dimethoxy-1-phenyl-3,4-dihydro-2(1H)-isoquinolinecarbonyl chloride. An exothermic reaction ensues. The mixture is heated over a steam bath for approximately 30 minutes. (Alternatively, the mixture can be maintained at room temperature overnight.) The reaction mixture is then poured into water and extracted with ethyl ether. The ether layer is dried over anhydrous calcium sulfate and evaporated to dryness. The solid thus obtained is crystallized from a mixture of ethyl ether and n-hexane to afford N-(2-diethylaminoethyl)-6,7-dimethoxy-1-phenyl-3,4-dihydro-2(1H)-isoquinolecarboxamide, melting at about 97°–98°C.

Substitution of an equivalent quantity of 2-diisopropylaminoethylamine for the 2-diethylaminoethylamine used above and substantial repetition of the foregoing procedure affords N-(2-diisopropylaminoethyl)-6,7-dimethoxy-1-phenyl-3,4-dihydro-2(1H)-isoquinolinecarboxamide, melting at about 109°–110°C. That compound can be represented by the following structural formula:

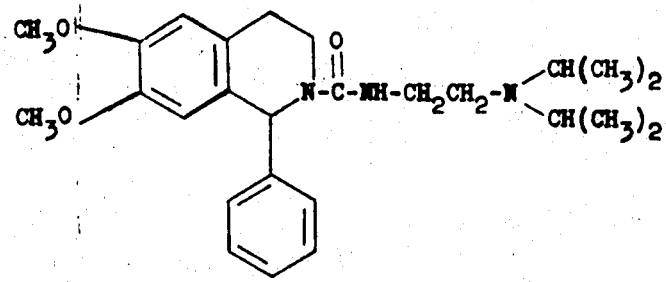

EXAMPLE 9

When an equivalent quantity of 2-piperidinoethylamine is substituted for the 2-diethylaminoethylamine used in Example 8 and the procedure described in the first paragraph of that example is substantially repeated, there is obtained, after crystallization from ethyl ether, 6,7-dimethoxy-1-phenyl-n-(N-(2-piperidinoethyl)-3,4-dihydro-2(1H)-isoquinolinecarboxamide. That compound melts at about 101°–102°C. and can be represented by the following structural formula:

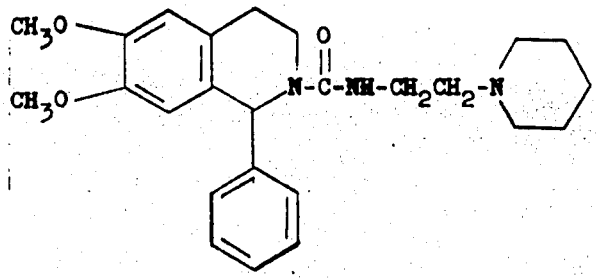

EXAMPLE 10

An equivalent quantity of 2-morpholinoethylamine is substituted for the 2-diethylaminoethylamine employed in Example 8 and the procedure described in the first paragraph of that example is repeated. After the mixture is heated over a steam bath for 30 minutes, it is poured into water and extracted with methylene chloride. The methylene chloride extract is then stripped of solvent in vacuo and the residue is crystallized from a mixture of methylene chloride and ethyl ether. The product obtained in this manner is 6,7-dimethoxy-N-(2-morpholinoethyl)-1-phenyl-3,4-dihydro-2(1H)-isoquinolinecarboxamide, melting at about 130°–131°C.

EXAMPLE 11

3.0 Parts of dimethoxy-1-phenyl-3,4-dihydro-2(1H)-isoquinolinecarbonyl chloride and 10 parts by volume of 3-diethylaminopropylamine are cooled and then combined in the cold. The resultant mixture is allowed to stand at room temperature overnight, then is poured into water and extracted with ethyl ether. The ether extract is dried over anhydrous calcium sulfate, concentrated to a small volume under reduced pressure and cooled in ice to effect crystallization. There is thus obtained N-(3-diethylaminopropyl)-6,7-dimethoxy-1-phenyl-3,4-dihydro-2(1H)-isoquinolinecarboxamide melting at about 92°–93°C.

Repetition of the above procedure using an equivalent quantity of 2-dimethylaminoethylamine affords 6,-7-dimethoxy-N-(2-dimethylaminoethyl)-1-phenyl-3,4-dihydro-2(1H)-isoquinolinecarboxamide melting at about 60°C.

In a similar manner, substitution of an equivalent quantity of 3-dimethylaminopropylamine in the procedure detailed above affords 6,7-dimethoxy-N-(3-dimethylaminopropyl)-1-phenyl-3,4-dihydro-2(1H)-isoquinolinecarboxamide.

EXAMPLE 12

To a mixture of 2.5 parts of 2-diisopropylaminoethylamine and 12 parts of triethylamine in approximately 225 parts of chloroform is added portionwise, at room temperature, a solution of 5.0 parts of 6,7-dimethoxy-1(4-methoxyphenyl)-3,4-dihydro-2(1H)-isoquinolinecarbonyl chloride in about 75 parts of chloroform. The reaction mixture is stirred for 3 to 5 hours, allowed to stand overnight and then poured into water. The chloroform layer is separated, dried over anhydrous calcium sulfate and stripped of solvent under reduced pressure. The resultant oil is triturated with n-hexane to give a solid. Crystallization of that solid from ethyl ether affords N-(2-diisopropylaminoethyl)-6,7-dimethoxy-1(4-methoxyphenyl)-3,4-dihydro-2(1H)-isoquinolinecarboxamide as a low melting solid. That compound is characterized by infrared absorption maxima in chloroform at about 1,640 and 3,400 cm$^{-1}$.

Substitution of an equivalent quantity of 2-[N-cyclohexyl(methylamino)]ethylamine for the 2-diisopropylaminoethylamine used above and substantial repetition of the foregoing procedure affords N-{2-[N-cyclohexyl)methylamino)]ethyl-6,7-}dimethoxy-1-(4-methoxyphenyl)-3,4-dihydro-2(1H)-isoquinolinecarboxamide, as a low melting solid. That compound exhibits infrared absorption maxima in chloroform at about 1,640 and 3,420 cm$^{-1}$ and can be represented by the following structural formula

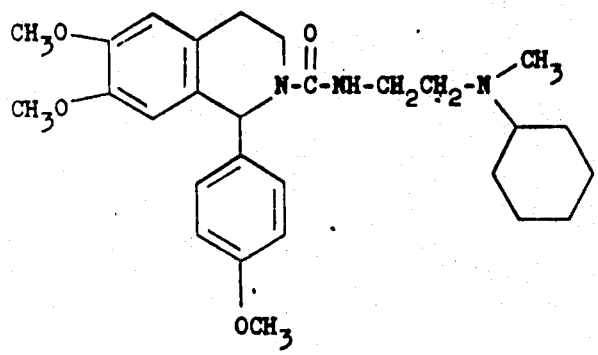

EXAMPLE 13

4.0 Parts of 2-diisopropylaminoethylamine in 75 parts of chloroform is added portionwise, at room temperature, to a mixture of 8.0 parts of 6,7-dimethoxy-1-(3,4-dimethoxyphenyl)-3,4-dihydro-2(1H)-isoquinolinecarbonyl -isoquinolinecarbonyl chloride and 15 parts of triethylamine in 225 parts of chloroform. After the addition is complete, the mixture is stirred for 3 to 4 hours, allowed to stand overnight, and then washed with water. The chloroform layer is separated, dried over anhydrous calcium sulfate and concentrated under reduced pressure. The solid material obtained in this manner is crystallized from ether to give N-(2-diisopropylaminoethyl)-6,7-dimethoxy-1-3,4-dimethoxyphenyl)-3,4-dihydro-2(1H)-isoquinolinecarboxamide; melting at about 114°–115°C.

When an equivalent quantity of 2-[N-cyclohexyl(methylamino)]ethylamine is substituted for the 2-diisopropylaminoethylamine used above and the foregoing procedure is substantially repeated, there is obtained N- 2-[N-cyclohexyl(methylamino)]ethyl - 6,7-dimethoxy-1-(3,4-dimethoxyphenyl)-3,4-dihydro-2(1H) -isoquinolinecarboxamide, melting at about 112°–113°C.

EXAMPLE 14

When an equivalent quantity of 1-phenyl-3,4-dihydro-2(1H)-isoquinolinecarbonyl chloride is substituted for the 6,7-dimethoxy-1-(3,4-dimethoxyphenyl)-3,4-dihydro-2(1H)-isoquinolinecarbonyl chloride used in Example 13 and the procedure detailed in the first paragraph of that example is substantially repeated, there is obtained, after crystallization from a mixture of ethyl ether and n-hexane, N-(2-diisopropylaminoethyl)-1-phenyl-3,4-dihydro-2(1H)-isoquinolinecarboxamide, melting at about 101°–103°C. That compound can be represented by the structural formula:

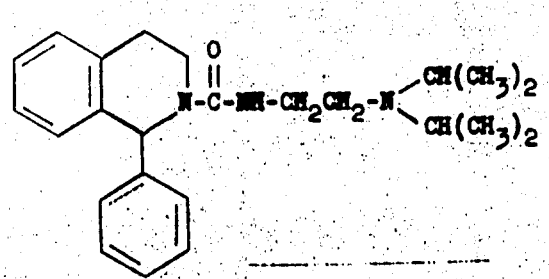

EXAMPLE 15

Equivalent quantities of 2-[N-cyclohexyl)methylamino)]ethylamine and 6,7-dimethoxy-1-phenyl-3,4-dihydro-2(1H)-isoquinolinecarbonyl chloride are substituted for the 2-diisopropylaminoethylamine and 6,7-dimethoxy-1-(3,4-dimethoxyphenyl)-3,4-dihydro-2(1H)-isoquinolinecarbonyl chloride used in Example 13 and the procedure there described is substantially repeated. There is thus obtained, after crystallization from a mixture of methylene chloride and n-hexane, N- 2-[N-cyclohexyl(methylamino)]ethyl -6,7-dimethoxy-1-phenyl-3,4-dihydro-2(1H)-isoquinolinecarboxamide. That product melts at about 136°–138°C. and can be represented by the following structural formula:

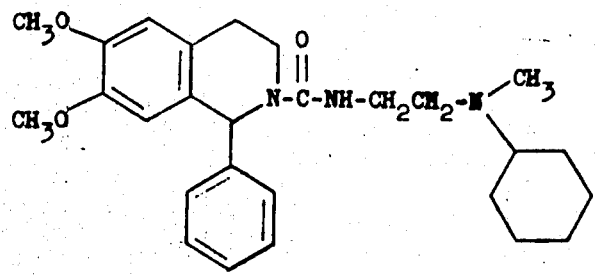

EXAMPLE 16

Equivalent quantities of 2-[N-cyclohexyl(methylamino)]ethylamine and 6-benzyloxy-7-methoxy-1-phenyl-3,4-dihydro-2(1H)-isoquinolinecarbonyl chloride are substituted for the 2-diisopropylaminoethylamine and 6,7-dimethyoxy-1-(3,4-dimethoxyphenyl)-3,4-dihydro-2(1H)-isoquinolinecarbonyl chloride used in Example 13 and the procedure described therein is substantially repeated, affording 6-benzyloxy-N- 2-[N-cyclohexyl(methylamino)]ethyl -7-methoxy-1-phenyl-3,4-dihydro-2(1H)-isoquinolinecarboxamide. The product melts at 109°–110°C.

The procedure described in the first paragraph of Example 13 is repeated, except that an equivalent quantity of 6-benzyloxy-7-methoxy-1-phenyl-3,4-dihydro-2(1H)-isoquinolinecarbonyl chloride is used in place of the 6,7-dimethoxy-1-(3,4-dimethoxyphenyl)-3,4-dihydro-2(1H) -isoquinolinecarbonyl chloride and the product is crystallized from a mixture of methylene chloride and n-hexane. Obtained in this manner is 6-benzyloxy-N-(2-diisopropylaminoethyl)-7-methoxy-1-phenyl-3,4-dihydro-2(1H)-isoquinolinecarboxamide, which melts at about 150°–152°C. and can be represented by the following structural formula:

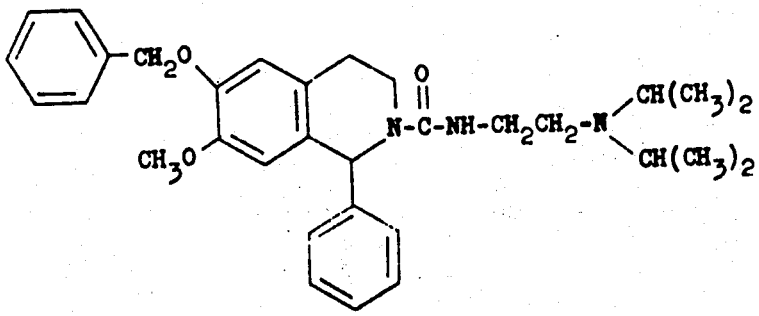

EXAMPLE 17

If the appropriate substituted 3,4-dihydro-2(1H)-isoquinolinecarbonyl chloride is reacted with the appropriate diamine according to the procedure described in Example 13, the following compounds are obtained.

7-Benzyloxy-N-(2-diisopropylaminoethyl)-6-methoxy-1-phenyl-3,4-dihydro-2(1H)-isoquinolinecarboxamide, melting at about 142°–144°C. after crystallization from a mixture of methylene chloride and n-hexane.

7-Benzyloxy-N- 2-[N-cyclohexyl(methylamino)]ethyl -6-methoxy-1-phenyl-3,4-dihydro-2(1H)-isoquinolinecarboxamide, melting at about 109°–111°C. after crystallization from a mixture of methylene chloride and n-hexane.

1-Benzyl-N-(2-diisopropylaminoethyl)-6,7-dimethoxy-3,4-dihydro-2(1H)-isoquinolinecarboxamide, which melts at about 87°–89°C. after crystallization from n-hexane.

1-(4-chlorophenyl)-N- 2-[N-cyclohexyl(methylamino)]-ethyl 6,7-dimethoxy-3,4-dihydro-2(1H)-isoquinolinecarboxamide, which melts at about 142°–143°C. after crystallization from a mixture of methylene chloride and n-hexane.

1-(4-Chlorophenyl)-N (2-diisopropylaminoethyl)-6,7-dimethoxy-3,4-dihydro-2(1H)-isoquinolinecarboxamide, melting at about 128°–129°C. after crystallization from a mixture of ethyl and n-hexane.

N-(2-Diisopropylaminoethyl)-6,7-dimethoxy-1-(4-fluorophenyl)-3,4-dihydro-2(1H)-isoquinolinecarboxamide, melting at about 136°–137°C. after crystallization from a mixture of methylene chloride and n-hexane.

N- 2-[N-Cyclohexyl(methylamino)]ethyl -6,7-dimethoxy-1-(4-fluorophenyl)-3,4-dihydro-2(1H)-isoquinolinecarboxamide, which melts at about 149°–150°C. after crystallization from a mixture of methylene chloride and n-hexane.

6,7-Dimethoxy-N-(2-hexamethyleneiminoethyl)-1-phenyl-3,4-dihydro-2(1H)-isoquinolinecarboxamide.

6,7-Dimethoxy-1-(4-fluorophenyl)-N-(2-hexamethyleneiminoethyl)-3,4-dihydro-2(1H)-isoquinolinecarboxamide, melting at about 95°–96°C. after crystallization from a mixture of ethyl ether and n-hexane.

1-Benzyl-6,7-dimethoxy-N-(2-hexamethyleneiminoethyl)-3,4-dihydro-2(1H)-isoquinolinecarboxamide.

6,7-Dimethoxy-N-[2-(4-methyl-1-piperazinyl)ethy-1-phenyl-3,4-dihydro-2(1H)-isoquinolinecarboxamide.

6,7-Dimethoxy-1-phenyl-N-[2-(4-phenylpiperidino)ethyl]-3,4-dihydro-2(1H)-isoquinolinecarboxamide.

6,7-Dimethoxy-1-phenyl- N-[2-(1-pyrrolidinyl)ethyl]-3,4-dihydro-2(1H)-isoquinolinecarboxamide.

N-(2-Diisopropylaminoethyl)-7-methyl-1-phenyl-3,4-dihydro-2(1H)-isoquinolinecarboxamide.

N-(2-Diisopropylaminoethyl)-6,7-methylenedioxy-1-phenyl-3,4-dihydro-2(1H)-isoquinolinecarboxamide.

N-(2-Diisopropylaminoethyl)-6,7-ethylenedioxy-1-phenyl-3,4-dihydro-2-(1H)-isoquinolinecarboxamide.

N- 2-[N-Cyclohexyl(methylamino)]ethyl -6,7-methylenedioxy-1-phenyl-3,4-dihydro-2(1H)-isoquinolinecarboxamide.

N- 2-[N-Cyclohexyl(methylamino)]ethyl -6,7-ethylenedioxy-1-phenyl-3,4-dihydro-2(1H)-isoquinolinecarboxamide.

EXAMPLE 18

Subsitution of an equivalent quantity of N,N,N'-trimethylethylenediamine for the 2-diisopropylaminoethylamine used in Example 12 and substantial repetition of the procedure detailed in the first paragraph of that example affords 6,7-dimethoxy-N-(2-dimethylaminoethyl)-1-(4-methoxyphenyl) -N-methyl-3,4-dihydro-2(1H)-isoquinolinecarboxamide.

In a similar manner, used of equivalent quantities of N,N,N'-triisopropylethylenediamine and 6,7-dimethoxy-1-phenyl-3,4-dihydro-2(1H)-isoquinolinecarbonyl chloride in place of the dialkylaminoalkylamine and isoquinolinecarbonyl chloride employed in Example 12 affords N-(2-

-diisopropylaminoethyl)-6,7-dimethoxy-N-isopropyl-1-phenyl-3,4-dihydro-2(1H)-isoquinolinecarboxamide.

EXAMPLE 19

A solution of 2.0 parts of 2-chloroethylisocyanate in approximately 14 parts of methylene chloride is added portionwise, at room temperature, to 5.0 parts of 6,7-dimethoxy-1-phenyl-1,2,3,4-tetrahydroisoquinoline in 27 parts of methylene chloride. The reaction mixture is stirred for 2 hours, then is stripped of solvent under reduced pressure. The residue is triturated with ether to give, as a solid, N-(2-chloroethyl)-6,7-dimethoxy-1-phenyl-3,4-dihydro-2(1H)-isoquinolinecarboxamide.

EXAMPLE 20

A mixture of 3.0 parts of the N-(2-chloroethyl)-6,7-dimethoxy-1-phenyl-3,4-dihydro-2(1H)-isoquinolinecarboxamide prepared in Example 19 and 4.3 parts of piperidine in approximately 40 parts of 2-butanone is heated at 65°C. for 20 hours. The reaction mixture is then stripped in vacuo and the residue is taken up in dilute aqueous potassium bicarbonate solution and methylene chloride. The organic layer is dried and stripped in vacuo and the residue is crystallized from ether to afford 6,7-dimethoxy-1-phenyl-N-(2-piperidinoethyl)-3,4-dihydro-2(1H)-isoquinolinecarboxamide, melting at about 101°–102°C.

Substitution of an equivalent quatity of 4-benzylpiperidine for the piperidine used above and substantial repetition of the foregoing procedure affords N-[2-(4-benzylpiperidino)ethyl]-6,7-dimethoxy-1-phenyl-3,4-dihydro-2-(1H)-isoquinolinecarboxamide.

In a similar manner, use of 1-phenylpiperazine in place of the piperidine employed in the procedure detailed in the first paragraph of this example gives 6,7-dimethoxy-1-phenyl-N-[2-(4-phenyl-1-piperazinyl)ethyl]3,4-dihydro-2(1H)-isoquinolinecarboxamide.

EXAMPLE 21

2.0 Parts of 6-benzyloxy-N-(2-diisopropylaminoethyl)-7-methoxy-1-phenyl-3,4-dihydro-2(1H)-isoquinolinecarboxamide is dissolved in approximately 80 parts of methanol. 0.2 Part of a 5% palladium-on-carbon catalyst is added and the mixture is shaken at room temperature and a pressure of about 2 psi for approximately 23 hours or until one molecular equivalent of hydrogen has been absorbed. The catalyst is removed by filtration and the filtrate is concentrated under reduced pressure to give an oil which solidifies upon trituration with n-pentane. That solid is crystallized from a mixture of methylene chloride and n-hexane to afford N-(2-diisopropylaminoethyl)-6-hydroxy-7-methoxy-1-phenyl-3,4-dihydro-2(1H)-isoquinolinecarboxamide, melting at about 91°–92°C.

The procedure described above is repeated using 6-benzyloxy-N- 2-[N-cyclohexyl(methylamino)]ethyl -7-methoxy-1-phenyl-3,4-dihydro-2(1H)-isoquinolinecarboxamide. Obtained in this manner is N- 2-[N-cyclohexyl(methylamino)]ethyl -6-hydroxy-7-methoxy-1-phenyl-3,4-dihydro-2(1H)-isoquinolinecarboxamide, an amorphous solid which exhibits infrared absorption maxima in chloroform at about 1,635, 3,420 and 3,560 cm$^{-1}$.

Repetition of the procedure detailed in the first paragarph of this example using 7-benzyloxy-N-(2-diisopropylaminoethyl)-6-methoxy-1-phenyl-3,4-dihydro-2(1H)-isoquinolinecarboxamide gives N-(2-diisopropylaminoethyl)-7-hydroxy-6-methoxy-1-phenyl-3,4-dihydro-2(1H)-isoquinolinecarboxamide. That compound is obtained as an amorphous solid and is characterized by infrared absorption maxima in chloroform at about 1,635, 3,400 and 3,560 cm$^{-1}$.

EXAMPLE 22

2.0 Parts of N-(2-diisopropylaminoethyl)-1-phenyl-3,4-dihydro-2(1H)-isoquinolinecarboxamide is dissolved in 22.8 parts of methyl iodide and placed in a steam oven at 65°C. for about 16 hours. The reaction mixture is then concentrated under reduced pressure and the residue is dissolved in ethanol. Ethyl ether is added and the mixture is refrigerated until crystallization occurs. The product, which is N-(2-diisopropylaminoethyl)-1-phenyl-3,4-dihydro-2(1H)-isoquinolinecarboxamide methiodide, is separated and recrystallized from a mixture of ethanol and ethyl ether.

EXAMPLE 23

4.4 Parts of N-(2-diisopropylaminoethyl)-6,7-dimethoxy-1-phenyl-3,4-dihydro-2(1H)-isoquinolinecarboxamide is dissolved in 110 parts of dimethylsulfoxide. Then 0.24 part of sodium hydride, as a 56% suspension in mineral oil, is added. The mixture is stirred for 30 minutes at room temperature. 1.42 Parts of methyl iodide is added portionwise at room temperature and the resultant mixture is stirred overnight in a nitrogen atmosphere. The mixture is then poured into water and extracted with methylene chloride. The methylene chloride extract is dried over anhydrous calcium sulfate and stripped under reduced pressure to give N-(2-diisopropylaminoethyl)-6,7-dimethoxy-N-methyl-1-phenyl-3,4-dihydro-2(1H)-isoquinolinecarboxamide.

What is claimed is:

1. A compound of the formula

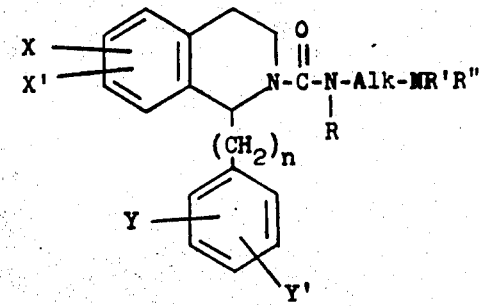

wherein X and X' are each selected from the group consisting of hydrogen, lower alkoxy, hydroxy, benzyloxy and methyl, or X and X' together represent a single methylenedioxy or ethylenedioxy group; Y and Y' are each selected from the group consisting of hydrogen, halogen and lower alkoxy; n is selected from the group consisting of 0 and 1; R is selected from the group consisting of hydrogen and lower alkyl, Alk is lower alkylene of 2 to 6 carbon atoms separating the nitrogen atoms attached thereto by at least 2 carbon atoms; and NR'R" is selected from the group consisting of di(lower alkyl) amino, N-cyclohexyl(lower alkylamino), 1-pyrrolidinyl, hexamethyleneimino, piperidino, 4-phenylpiperidino, and 4-benzylpiperidino,.

2. A compound according to claim 1 which has the formula

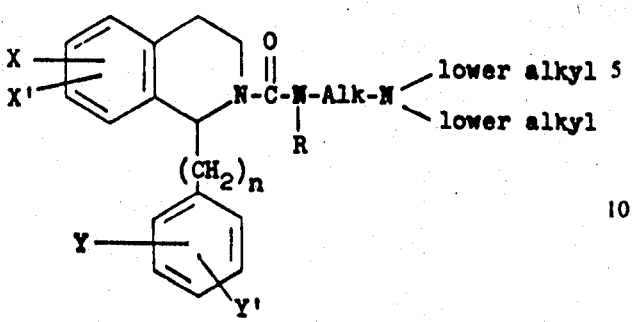

wherein X and X' are each selected from the group consisting of hydrogen, lower alkoxy, hydroxy, benzyloxy and methyl, or X and X' together represent a single methylenedioxy or ethylenedioxy group; Y and Y' are each selected from the group consisting of hydrogen, halogen and lower alkoxy; n is selected from the group consisting of 0 and 1; R is selected from the group consisting of hydrogen and lower alkyl; and Alk is lower alkylene separating the nitrogen atoms attached thereto by at least 2 carbon atoms.

3. A compound according to claim 1 which is N-(2-diisopropylaminoethyl)-1-phenyl-3,4-dihydro-2(1H)-isoquinolinecarboxamide.

4. A compound according to claim 1 which is 6-benzyloxy-N-(2-diisopropylaminoethyl)-7-methoxy-1-phenyl-3,4-dihydro-2(1H)-isoquinolinecarboxamide.

5. A compound according to claim 1 which is 7-benzyloxy-N-(2-diisopropylaminoethyl)-6-methoxy-1-phenyl-3,4-dihydro-2(1H)-isoquinolinecarboxamide.

6. A compound according to claim 1 which has the formula

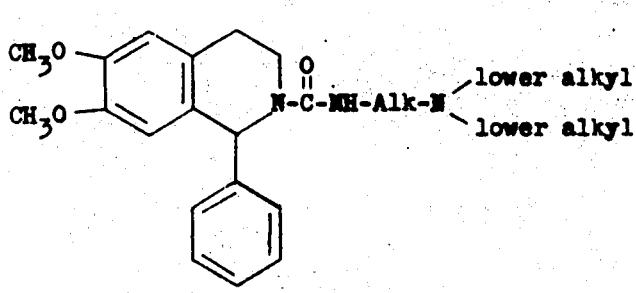

wherein Alk is lower alkylene separating the nitrogen atoms attached thereto by at least 2 carbon atoms.

7. A compound according to claim 1 which is N-(2-diethylaminoethyl)-6,7-dimethoxy-1-phenyl-3,4-dihydro-2(1H)-isoquinolinecarboxamide.

8. A compound according to claim 1 which is N-(2-diisopropylaminoethyl)-6,7-dimethoxy-1-phenyl-3,4-dihydro-2(1H)-isoquinolinecarboxamide.

9. A compound according to claim 1 which has the formula

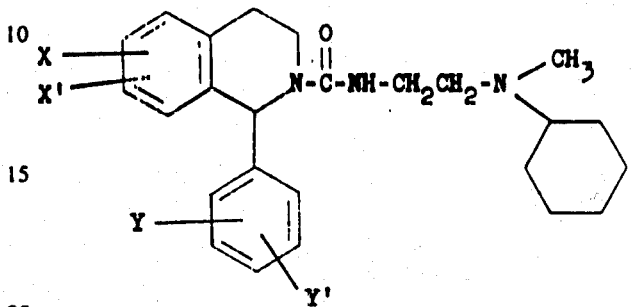

wherein X and X' are each selected from the group consisting of lower alkoxy, hydroxy and benzyloxy, or X and X' together represent a single methylenedioxy or ethylenedioxy group; and Y and Y' are each selected from the group consisting of hydrogen, halogen and lower alkoxy.

10. A compound according to claim 1 which is N-{2-[N-cyclohexyl(methylamino)]ethyl}-6,7-dimethoxy-1-(4-methoxyphenyl)-3,4-dihydro-2-(1H)-isoquinolinecarboxamide.

11. A compound according to claim 1 which is N-{2-[N-cyclohexyl)methylamino)]ethyl}-6,7-dimethoxy-1-phenyl-3,4-dihydro-2(1H)-isoquinolinecarboxamide.

12. A compound according to claim 1 which is 7-benzyloxy-N-{2-[N-cyclohexyl(methylamino)]ethyl}-methoxy-1-phenyl-3,4-dihydro-2(1H)-isoquinolinecarboxamide.

* * * * *

UNITED STATES PATENT OFFICE
CERTIFICATE OF CORRECTION

PATENT NO. : 3,905,982
DATED : September 16, 1975
INVENTOR(S) : Peter K. Yonan

It is certified that error appears in the above-identified patent and that said Letters Patent are hereby corrected as shown below:

Column 2, line 9, "heat" should read -- heart --.

Column 4, line 26, "temperature 60°" should read -- temperature to 60° --.

Column 5, line 40, after "or" delete "ethylenedioxy-β" and insert -- 3,4 --.

Column 7, line 21, "tetrahydroisoquinoine" should read -- tetrahydroisoquinoline --.

Column 9, line 65, "dimethoxy" should read -- 6,7-dimethoxy --.

Column 10, line 61, "ethyl-6,7-}" should read -- ethyl}-6,7 --.

Column 11, line 22, delete first "isoquinolinecarbonyl"

Column 11, line 30, "-1-" should read -- -1-( --.

Column 11, line 38, after first "N-" insert -- { -- and after "ethyl" insert -- } --.

Column 12, line 12, after first "N-" insert -- { --.

Column 12, line 13, after "ethyl" insert -- } --.

Column 12, line 52, after "-N-" insert -- { --.

Column 12, line 53, after "ethyl" insert -- } --.

UNITED STATES PATENT OFFICE
CERTIFICATE OF CORRECTION

PATENT NO. : 3,905,982
DATED : September 16, 1975
INVENTOR(S) : Peter K. Yonan

It is certified that error appears in the above-identified patent and that said Letters Patent are hereby corrected as shown below:

Column 13, line 27, after "N-" insert -- { --.

Column 13, line 28, after "ethyl" insert -- } --.

Column 13, line 38, after "N-" insert -- { --.

Column 13, line 39, after "ethyl" insert -- } --.

Column 13, line 55, after "N-" insert -- { -- and after "ethyl" insert -- } --.

Column 14, line 19, ")ethy-" should read -- )ethyl]- --.

Column 14, line 32, after first "N" insert -- { -- and after "ethyl" insert -- } --.

Column 14, line 35, after first "N-" insert -- { -- and after "ethyl" insert -- } --.

Column 14, line 50, "used" should read -- use --.

Column 15, line 51, after first "N-" insert -- { -- and after "ethyl" insert -- } --.

Column 15, line 54, after first "N-" insert -- { --.

Column 15, line 55, after "ethyl" insert -- } --.

Column 18, line 36, after "ethyl}-" insert -- 6 --.

Signed and Sealed this eleventh Day of May 1976

[SEAL]

Attest:

RUTH C. MASON
Attesting Officer

C. MARSHALL DANN
Commissioner of Patents and Trademarks